(12) United States Patent
Kunti et al.

(10) Patent No.: US 8,538,793 B2
(45) Date of Patent: Sep. 17, 2013

(54) SYSTEM AND METHOD FOR MANAGING REAL-TIME BATCH WORKFLOWS

(75) Inventors: Krishnendu Kunti, West Bengal (IN); Bhalwan Singh Gurna, Andhra Pradesh (IN)

(73) Assignee: Infosys Limited, Bangalore, Karnataka (IN)

( * ) Notice: Subject to any disclaimer, the term of this patent is extended or adjusted under 35 U.S.C. 154(b) by 26 days.

(21) Appl. No.: 13/073,244

(22) Filed: Mar. 28, 2011

(65) Prior Publication Data
US 2012/0215583 A1    Aug. 23, 2012

(30) Foreign Application Priority Data
Feb. 17, 2011    (IN) .............................. 453/CHE/2011

(51) Int. Cl.
 *G06Q 10/00*    (2012.01)
(52) U.S. Cl.
 USPC ........................................................ 705/7.27
(58) Field of Classification Search
 USPC ........................................................ 705/7.27
 See application file for complete search history.

(56) References Cited

U.S. PATENT DOCUMENTS

| | | | | |
|---|---|---|---|---|
| 5,826,239 | A * | 10/1998 | Du et al. ...................... | 705/7.26 |
| 7,464,366 | B2 * | 12/2008 | Shukla et al. ................. | 717/100 |
| 8,229,836 | B2 * | 7/2012 | Chehade et al. ................ | 705/37 |
| 8,250,205 | B2 * | 8/2012 | Ishizawa et al. .............. | 709/224 |
| 2006/0074731 | A1 * | 4/2006 | Green et al. ..................... | 705/8 |
| 2006/0136279 | A1 * | 6/2006 | Maybee et al. ................... | 705/9 |
| 2006/0195347 | A1 * | 8/2006 | Bultmeyer et al. .............. | 705/8 |
| 2009/0249187 | A1 * | 10/2009 | Morris et al. ................. | 715/234 |
| 2009/0287528 | A1 * | 11/2009 | Strickland et al. ............... | 705/9 |

* cited by examiner

*Primary Examiner* — Romain Jeanty
(74) *Attorney, Agent, or Firm* — Michael Best & Friedrich LLP

(57) ABSTRACT

A system and method for executing and managing a business process in a unified business process environment is provided. The methodology of the invention describes steps to execute a business process and thereafter monitor the executed business process in a unified business process environment. A business process is received in a unified business process environment. The business process comprises at least one workflow. The methodology further ascertains execution details of the at least one workflow based on a predefined attribute of the at least one workflow. Thereafter, the methodology processes the at least one workflow at a location selected from at least one of a grid processing environment and a local processing environment, based on the ascertained execution details of the at least one workflow. After which, the methodology monitors the at least one workflow, executed for processing at the grid processing environment and the local processing environment.

19 Claims, 9 Drawing Sheets

SYSTEM AND METHOD FOR MANAGING REAL-TIME BATCH WORKFLOWS

FIELD OF INVENTION

The present invention relates to real-time and batch workflows. More particularly, the present invention provides a unified environment/integrated development environment (IDE) for developing, executing and managing real-time and batch workflows.

BACKGROUND OF THE INVENTION

Various business organizations today utilize business process management (BPM) to efficiently manage multiple business processes. The business processes/tasks can be a banking service offered to a client, a day to day business processes executed at an organization and so forth. With emerging markets and competitive business in place, the business processes have become more complex in recent times. To further optimize these complex and competitive business processes, BPM has been integrated with electronic processing (software) solutions to streamline and automate the business processes involved.

Typically, business processes comprises real-time and batch activities. A real-time activity is a continuous process in which the input data is processed as soon as the real-time activity is triggered i.e. there is ideally no delay between the initiation and processing of the task. For example, in a fund transaction system, as soon as an end-user inputs his credential and submits a request for the fund transfer, the transaction system initiates the processing. Thereafter, the transaction system validates the credential of the end-user and subsequently authorizes the fund transfer in case all the predefined conditions of the activity are valid. In such an activity the time delay between the input and output (transfer of fund) is minimal. On the other hand, a batch activity is a group of processes usually invoked through a pre-determined condition, such as a predefined time (end of every month, a fixed date), a trigger from a particular event. Moreover, the processing of the batch activity is not instantaneous as in case of a real-time activity. For example, in a monthly statement generation activity, in which the monthly statement of a particular end-user is generated only after all transaction reports of the end-user have been collected over a predefined period of time (30 days). A batch activity is an efficient way of processing large volume of data and is actively employed for systems requiring systematic processing of large volume of data, such as payroll system, examination system, and billing system.

Presently, in a processing environment a real-time activity and a batch activity are seen as different activities, and as a result they are processed in isolation of one another. There are scenarios in which the business process requires the real-time activity and the batch activity to be integrated and subsequently be processed in a single development environment. To achieve the abovementioned functionality, various techniques have been employed in the art. The primary technique employed is to servicify a batch activity, wherein a batch script is created to trigger a batch activity encountered at the single development environment. Therefore, once a batch activity is encountered in a business process (including both real-time and batch activities), a batch script invokes the batch activity for further processing in a parallel interface. This methodology requires creation of individual script to execute a particular batch activity.

Alternately, asynchronous invocation may be used to invoke a batch activity in a single development environment. In asynchronous invocation an external message is send to the batch interface in order to execute the batch activity. The message trigger may utilize Java Message Service (JMS) to communicate between the two interfaces. This methodology also requires creation of a particular message to trigger the batch activity. However, in both the techniques, skilled person are required to create respective batch script and message in order to execute a batch activity in a single environment. Furthermore, it is difficult to monitor the status of the batch activity in case of asynchronous invocation, as because once a message is sent from the real-time process to the batch interface both the systems work in isolation.

In light of abovementioned disadvantages, there is a need for a method and a system to integrate real-time activity and batch activity in a unified environment. Further, there is a need to automate the processing of real-time and batch activity with minimal human intervention.

SUMMARY OF THE INVENTION

A system and method for executing and managing a business process in a unified business process environment is provided. In an embodiment of the present invention, the method for executing a business process comprises receiving a business process, via program instructions executed by a computing system, from a user in a unified business process environment. The business process comprises at least one workflow. The method further comprises ascertaining, via program instructions executed by a computing system, execution details of the at least one workflow based on a predefined attribute of the at least one workflow. The method furthermore comprises processing, via program instructions executed by a computing system, the at least one workflow at a location selected from at least one of a grid processing environment and a local processing environment, based on the ascertained execution details of the at least one workflow.

In an embodiment of the present invention, the predefined attribute of the at least one workflow comprises at least one of a batch workflow and a real-time workflow.

In an embodiment of the present invention, the method for executing a business process further comprises converting, via program instructions executed by a computing system, the received at least one workflow in a batch workflow execution language definition, in case the received at least one workflow is a batch workflow. The method furthermore comprises converting, via program instructions executed by a computing system, the received at least one workflow in a real-time workflow execution language definition, in case the received at least one workflow is a real-time workflow.

In an embodiment of the present invention, the method for processing the at least one workflow at the location further comprises executing, via program instructions executed by a computing system, the at least one workflow at the grid processing environment, in case the predefined attribute of the at least one workflow is a batch workflow. The method furthermore comprises executing, via program instructions executed by a computing system, the at least one workflow at the local processing environment, in case the predefined attribute of the at least one workflow is a real-time workflow.

In an embodiment of the present invention, the method for executing the at least one workflow at a grid processing environment further comprises identifying, via program instructions executed by a computing system, one or more resources at the grid processing environment to process the at least one workflow, based on one or more predetermined parameters of the at least one workflow. The method furthermore comprises scheduling, via program instructions executed by a computing system, the at least one workflow at the one or more identified resources based on the one or more predetermined parameters of the at least one workflow. Further, the method comprises executing, via program instructions executed by a computing system, the scheduled at least one workflow at the one or more identified resources.

In an embodiment of the present invention, the method for executing the at least one workflow at a grid processing environment further comprises monitoring, via program instructions executed by a computing system, status of the processing of the at least one workflow at the grid processing environment after initiating execution of the at least one workflow.

In an embodiment of the present invention, the one or more predetermined parameters include at least one of a processing requirement, complexity, operating system, required architecture and execution time of the at least one workflow.

In an embodiment of the present invention, the method for processing the at least one workflow at the local processing environment further comprise monitoring, via program instructions executed by a computing system, status of the processing of the at least one workflow at the local processing environment after initiating execution of the at least one workflow.

In an embodiment of the present invention, the system for executing and monitoring a business process in a unified business process environment includes a Business Workflow Module, a Workflow Orchestrator, and a Workflow Monitoring and Control Module. The Business Workflow Module in communication with a computing system and operative to receive a business process from a user, wherein the business process comprises at least one workflow. The Workflow Orchestrator in communication with the computing system and operative to process the at least one workflow at a location selected from at least one of a grid processing environment and a local processing environment, based on a predefined attribute of the at least one workflow. The Workflow Monitoring and Control Module in communication with the computing system and operative to monitor the status of the processing of the at least one workflow at the predetermined processing location.

In an embodiment of the present invention, the Business Workflow Module is further operative to convert the received at least one workflow in a workflow execution language definition.

In an embodiment of the present invention, the Workflow Orchestrator includes a Core Orchestration Engine and a Workflow Reporting Module. The Core Orchestration Engine is operative to process the at least one workflow at a predefined location based on the predefined attribute of the at least one workflow. The Workflow Reporting Module is operative to monitor the status of the processing of the at least one workflow at the predefined processing location.

In an embodiment of the present invention, the Workflow Orchestrator further includes a error handling module. The error handling module is operative to direct one or more corrective actions in case it detects occurrence of one or more errors while processing the at least one workflow.

In an embodiment of the present invention, the predefined attribute of the at least one workflow can be at least one of batch and real-time.

In an embodiment of the present invention, the Core Orchestration Engine includes a Batch Construct Handler and a Real-time Construct Handler. The Batch Construct Handler is operative to process the at least one workflow at a grid processing environment in case the predefined attribute of the at least one workflow is batch. The Real-time Construct Handler is operative to process the at least one workflow at a local processing environment in case the predefined attribute of the at least one workflow is real-time.

In an embodiment of the present invention, the Core Orchestration Engine further includes a GRID Workflow Orchestration Module. The GRID Workflow Orchestration Module is operative to orchestrate the at least one workflow at a GRID processing environment, after being processed by the Batch Construct Handler.

In an embodiment of the present invention, the system for executing and monitoring a business process in a unified business process environment further includes a Meta-Scheduler and Job Management Module and a GRID Middleware. The Meta-Scheduler and Job Management Module in communication with the computer system and operative to identify one or more resources. Subsequently, the Meta-Scheduler and Job Management Module schedules the at least one workflow based on at least one of: one or more predetermined parameters of the at least one workflow and the identified one or more resources. The GRID Middleware in communication with the computer system and operative to execute the scheduled at least one workflow at the identified one or more resources.

In an embodiment of the present invention, the Meta-Scheduler and Job Management Module includes a Meta Scheduling Module, a GRID Job Management Module, and a GRID Job Reporting Module. The Meta Scheduling Module is operative to schedule the at least one workflow based on the one or more predetermined parameters. The GRID Job Management Module is operative to route the scheduled at least one workflow to the grid middleware to further execute it. The GRID Job Reporting Module is operative to track the status of the executed at least one workflow at a Grid Infrastructure.

In an embodiment of the present invention, the GRID Infrastructure includes the one or more resources identified for processing the at least one workflow.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
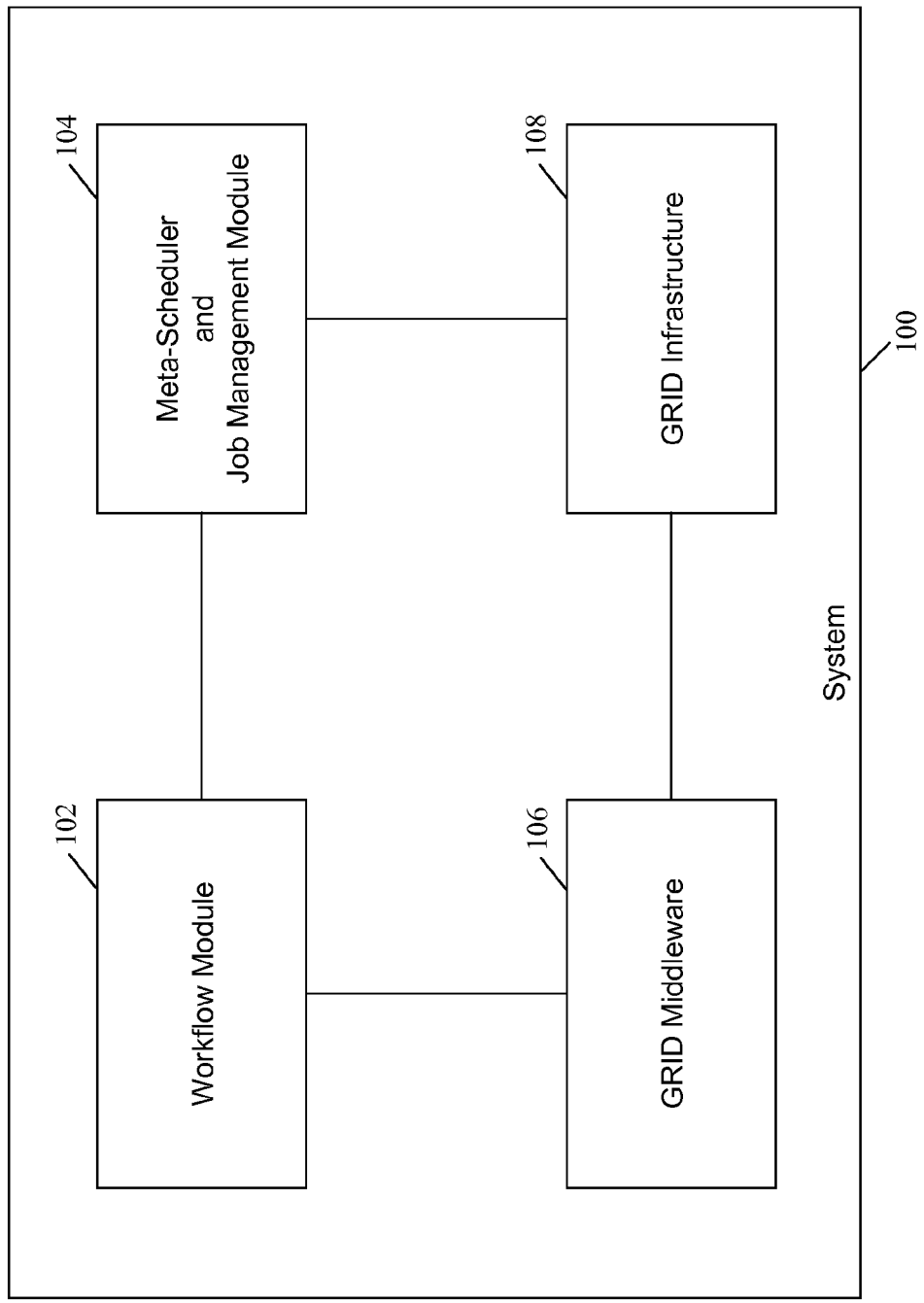
FIG. 1 is a block diagram of a system configured to process a business process in a unified business process environment in accordance with an embodiment of the present invention.

A system and method for developing, executing, and managing a batch workflow and a real-time workflow in a unified environment/integrated development environment (IDE) is provided. The method includes receiving a workflow definition for a business process from a developer. The method further includes identifying the type of workflow received and subsequently processing the received workflow locally, i.e. at the system where the IDE is implemented, in case the workflow is identified as a 'real-time' workflow. Alternately, the workflow is processed in a GRID environment, i.e. in a distributed resource environment, in case the workflow is identified as a 'batch' workflow.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention may be implemented in numerous ways including as a system, a method, or a computer readable medium such as a computer readable storage medium or a computer network wherein programming instructions are communicated from a remote location.

In a business organization various business processes are created to fulfill the requirements of respective clients/end-users. To better optimize these processes, they are translated into various workflows. The workflow can be either a real-time workflow or a batch workflow based on the methodology of its execution/processing (execution behavior). The real-time time workflow includes a real-time activity/process used for instantaneous processing i.e. there is ideally no delay between the initiation and processing of the task. On the other hand, the batch workflow includes a batch activity/process, which is initiated either on a predefined time or by a trigger from a particular event. A workflow comprises one or more activities, further each of the one or more activities are required to be processed to accomplish a given business task. In an exemplary embodiment of the present invention, a statement generation process is a business task (workflow), which is further composed of several activities, such as verifying account, sending query, retrieving data, displaying data and so forth.

FIG. 1 is a block diagram of a system configured to process a business process in a unified business process environment in accordance with an embodiment of the present invention. The System 100 includes a Workflow Module 102, a Meta-Scheduler and Job Management Module 104, a GRID Middleware 106 and a GRID Infrastructure 108.

The Workflow Module 102 enables a developer to model a workflow based on the business process requirement. The Workflow Module 102 captures the definition of the modeled workflow pictorially and subsequently identifies the workflow submitted by the developer, as either a real-time workflow or a batch workflow. The Workflow Module 102 thereafter, converts the received workflow into its corresponding workflow execution language definition. In an exemplary embodiment of the present invention, the workflow execution language used for the real-time workflow can be at least one of a Business Process Execution Language (BPEL), and a Business Process Modeling Language (BPML). In another exemplary embodiment of the present invention, the workflow execution language used for the batch workflow can be at least one of a GRID Workflow Description Language (GWorkflowDL), and a Workflow Process Definition Language (WPDL).

The Workflow Module 102 further controls the execution of the received workflow for both real-time workflows and batch workflows. In an embodiment of the present invention, the Workflow Module 102 processes the identified real-time workflow locally. Alternately, the Workflow Module 102 processes the identified batch workflow externally at a GRID processing environment. The methodology of processing the real-time workflow and the batch workflow are explained in conjunction with FIG. 3 and FIG. 4. Moreover, the Workflow Module 102 periodically monitors the status of all the workflows which are being processed by it.

The Meta-Scheduler and Job Management Module 104 works in conjunction with the Workflow Module 102 to manage the execution of the batch workflow. The Meta-Scheduler and Job Management Module 104 identifies one or more resources required to process the batch workflow. In an exemplary embodiment of the present invention, the one or more resources may be a computing system or a collection of computing systems. In an embodiment of the present invention, the one or more resources required to process the batch workflow are ascertained based on the amount of processing required by the batch activities included in the batch workflow. Further, Meta-Scheduler and Job Management Module 104 maps the one or more resources required to process the batch workflow to one or more resources available at a GRID Infrastructure 108. After which, it schedules the job (processing of the batch workflow) at the GRID Infrastructure 108 based on one or more pre-defined parameters, such as QoS (quality of service) parameters. Thereafter, once a job (processing of the batch workflow) is scheduled, the Meta-Scheduler and Job Management Module 104 updates the status of the job to the Workflow Module 102 in real time.

The GRID Middleware 106 governs and manages the GRID Infrastructure 108. The GRID Infrastructure 108 comprises one or more resources, which are used to process a batch workflow. In an exemplary embodiment of the present invention, the GRID Infrastructure 108 may be a plurality of networked computing devices. The GRID Middleware 106 administrates the GRID Infrastructure 108 to maintain seamless access to the computational power of the GRID Infrastructure 108 as well as to monitor the status and life cycle of the submitted job (processing of the batch workflow).

Figure 2:
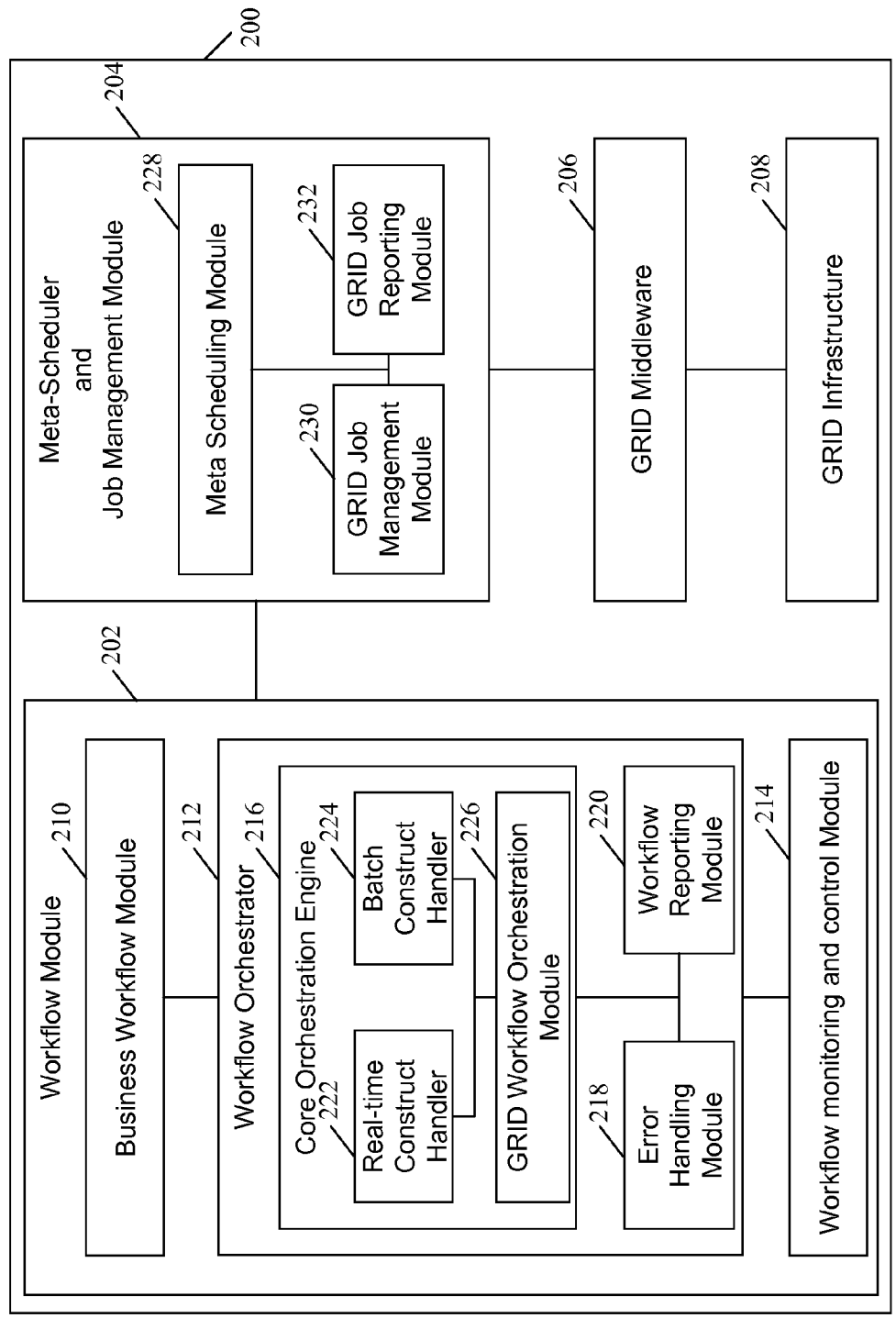
FIG. 2 is a detailed block diagram of a system configured to process a business process in a unified business process environment in accordance with another embodiment of the present invention.

FIG. 2 is a detailed block diagram of a system configured to process a business process in a unified business process environment in accordance with another embodiment of the present invention. System 200 includes a Workflow Module 202, a Meta-Scheduler and Job Management Module 204, a GRID Middleware 206 and a GRID Infrastructure 208.

The Workflow Module 202 further comprises a Business Workflow Module 210, a Workflow Orchestrator 212, and a Workflow Monitoring and Control Module 214.

The Business Workflow Module 210 provides an interface to the developer to model a workflow for a business process. As explained earlier in FIG. 1, the developer defines various activities based on the requirement of the business process. Additionally, an attribute "type" is associated to each activity in the workflow which indicates whether the activity is either a real-time workflow construct or a batch workflow construct. In an embodiment of the present invention, each of the activities are assigned an attribute "type" based on the execution behavior of the activity as either 'real-time' or 'batch'. In an exemplary embodiment of the present invention, in order to create a workflow definition for a statement generation activity (business process), the developer models the activities to be executed in the workflow, such as, authenticating activity, retrieving account data activity, generating statement activity, extracting statement activity, dispatching statement activity, and so forth. Subsequently, the workflow is identified as a real-time or batch workflow based on the execution behavior of the workflow. Thereafter, the attribute "type" is updated as "real-time" or "batch". In an embodiment of the present invention, each of the abovementioned activities is defined as a workflow construct.

The Business Workflow Module 210 converts the workflow into a corresponding executable workflow definition. In an embodiment of the present invention, after the developer models a workflow of the business process, the Business Workflow Module 210 converts the workflow into a corresponding executable workflow definition based on the attribute "type" associated with the workflow construct. In an exemplary embodiment of the present invention, the Business Workflow Module 210 converts a real-time workflow construct into an executable workflow definition using a Business Process Modeling Language (BPML). Alternately, the Business Workflow Module 210 converts a batch workflow construct into an executable workflow definition using a GRID Workflow Description Language (GWorkflowDL).

The Workflow Orchestrator 212 interprets the received workflow definition and thereafter processes the identified workflow constructs. The Workflow Orchestrator 212 further comprises a Core Orchestration Engine 216, an Error Handling Module 218 and a Workflow Reporting Module 220.

The Core Orchestration Engine 216 checks the received workflow definition of a workflow construct to identify its "type", wherein the attribute "type" indicates whether the workflow construct is a real-time workflow construct or a batch workflow construct. The Core Orchestration Engine 216 includes a Real-time Construct Handler 222, a Batch Construct Handler 224 and a GRID Workflow Orchestration Module 226. After determining the attribute 'type' of the workflow construct as 'real-time', the Core Orchestration Engine 216 invokes the Real-time Construct Handler 222 to process the workflow construct. Alternately, the Core Orchestration Engine 216 invokes the Batch Construct Handler 224 to process the workflow construct identified as 'batch'.

The Real-time Construct Handler 222 processes the received real-time workflow construct. After being invoked by the Core Orchestration Engine 216, to process the real-time workflow construct, the Real-time Construct Handler 222 gathers necessary input data corresponding to the real-time workflow from the Core Orchestration Engine 216. After which, the real-time workflow construct is processed locally. Additionally, the Real-time Construct Handler 222 transfers the operational control such as, pausing the activity, aborting the activity, suspending the activity and so forth to the Core Orchestration Engine 216. The operational control in turn enables the developer to administer the processing of the real-time workflow construct. The Real-time Construct Handler 222 also updates timely status of the job (processing of the real-time construct) to the Core Orchestration Engine 216 and on completion of the processing of the job sends the output of the process and status notification to the Core Orchestration Engine 216.

The Batch Construct Handler 224 executes the received batch workflow construct. After being invoked by the Core Orchestration Engine 216, to process the batch workflow construct, the Batch Construct Handler 224 may gather the necessary input/output parameters, such as workflow identification information, input files, and operational constants related to the batch workflow from the Core Orchestration Engine 216. In an embodiment of the present invention, a batch construct may be executed/triggered without input/output parameters. Thereafter, the Batch Construct Handler 224 triggers the GRID Workflow Orchestration Module 226 to further process the batch workflow construct at a GRID processing environment. After which, the Batch Construct Handler 224 goes into a dormant state.

The GRID Workflow Orchestration Module 226 orchestrate/coordinate the processing of the batch workflow construct. The Batch Construct Handler 224 triggers the GRID Workflow Orchestration Module 226 to further process the submitted batch workflow construct. Correspondingly, the GRID Workflow Orchestration Module 226 invokes the Meta-Scheduler and Job Management Module 204 for processing the batch workflow construct.

The Workflow Reporting Module 220 monitors the Meta-Scheduler and Job Management Module 204 for the 'status' of the submitted job. In an embodiment of the present invention, the job generally comprises of processing of the batch workflow construct. In an embodiment of the present invention, once the GRID Workflow Orchestration Module 226 invokes the Meta-Scheduler and Job Management Module 104 for processing the batch workflow construct, the Workflow Reporting Module 220 queries the Meta-Scheduler and Job Management Module 204, for the updated status of the job submitted at the GRID Middleware 206. In another embodiment of the present invention, the Workflow Reporting Module 220 pulls the status information of the submitted job from the Grid Job Reporting Module 232, at predetermined periodic intervals. As soon as the Workflow Reporting Module 220 receives the notification, by the Meta-Scheduler and Job Management Module 204, that the submitted job is completed, it invokes the dormant Batch Construct Handler 224 with the updated consolidated status of the job. Consequently, Batch Construct Handler 224 notifies Core Orchestration Engine 216 with the final status of the processed job.

The Error Handling Module 218 is a centralized error handling hub for both the real-time workflow construct and the batch workflow construct. The Error Handling Module 218 directs Core Orchestration Engine 216 to corrective action in case an error is observed while processing a workflow construct. A workflow construct execution involves various external inputs, such as human interaction (in case of real-time workflow construct), messages from other systems, Remote Procedure Call (RPC) and so forth. The workflow construct execution may observe execution error due to failure of the external input to provide a desired response. On completion of processing of each of the workflow construct, the Core Orchestration Engine 216 checks the status of the completed job for any error encountered, or for any unsuccessful job. In case, it detects an error/unsuccessful job, the Core Orchestration Engine 216 then consults the Error Handling Module 218 for corrective action(s). It may be apparent to a person skilled in the art that various predefined corrective action may be stored in the Error Handling Module 218. Moreover, in case a corrective action for an encountered error is not found in the Error Handling Module 218, the developer of the system is informed through a status report. Furthermore, the Error Handling Module 218 enables a developer to define one or more compensatory actions for respective errors encountered during processing of the workflow.

The Workflow Monitoring and Control Module 214 provides functionality to view detailed execution status of each of the workflow constructs corresponding to a business process, in a single monitoring console. In an embodiment of the present invention, the Workflow Monitoring and Control Module 214 provides a consolidated view of execution for both real-time workflow construct and batch workflow construct. Further, the Workflow Monitoring and Control Module 214 enables an administrator to control the submitted business process, by controlling the processing of the workflow constructs (real-time workflow construct and batch workflow construct) through operational actions, such as terminating, skipping, and pausing either a workflow construct or the business process as a whole.

The Meta-Scheduler and Job Management Module 204 manages the execution of the received batch workflow construct. The Meta-Scheduler and Job Management Module 204 includes a Meta Scheduling Module 228, a GRID Job Management Module 230 and a GRID Job Reporting Module 232.

The Meta Scheduling Module 228 schedules the processing of the received batch workflow construct over the GRID Infrastructure 208. In various embodiment of the present invention, after receiving the batch workflow construct, the Meta Scheduling Module 228 gathers one or more quality of service (QoS) parameters, such as operating system required, architecture required, memory requirements, software dependencies and so forth. The gathered information is then processed by the Meta Scheduling Module 228 to map one or more resources (required to process the batch workflow construct), to one or more resources available at the GRID Infrastructure 208. In an embodiment of the present invention, the QoS parameters define the expected execution environment for the job and also aid the Meta Scheduling Module 228 to choose the best possible resource available at the GRID Infrastructure 208.

The GRID Job Management Module 230 routes the scheduled job (processing of the batch workflow construct) to the GRID Middleware 206 for further processing. Once the received batch workflow construct is scheduled by the Meta Scheduling Module 228 for processing, the GRID Job Management Module 230 submits the job to the GRID Middleware 206 and consequently controls the processing of the batch workflow construct at the GRID Infrastructure 208 through the GRID Middleware 206. Additionally, the GRID Job Management Module 230 after submission of the job at GRID Middleware 206 enables an administrator to control the submitted job by providing operational controls, such as pausing the job, aborting the job, and suspending the job.

The GRID Job Reporting Module 232 interacts with the GRID Middleware 206 to monitor the status of the submitted job and other relevant metrics. After, the GRID Job Management Module 230 submits the scheduled job to the GRID Middleware 206, the GRID Job Reporting Module 232 receives timely update of the status (execution details) of the job by the GRID Middleware 206 dynamically (in a push mode) i.e. update of the job status as soon as execution of the job takes place. Furthermore, the GRID Job Reporting Module 232 provides the received status update of the submitted job to the Workflow Reporting Module 220, in response to a status update request initiated by the Workflow Reporting Module 220.

The GRID Middleware 206 executes the job in conjunction with GRID Infrastructure 208 as explained earlier in FIG. 1. The GRID Middleware 206 is the logical layer in the architecture stack which governs and manages GRID Infrastructure 208, wherein the GRID Infrastructure 208 includes the one or more resources required to process the batch workflow construct.

Figure 3A:
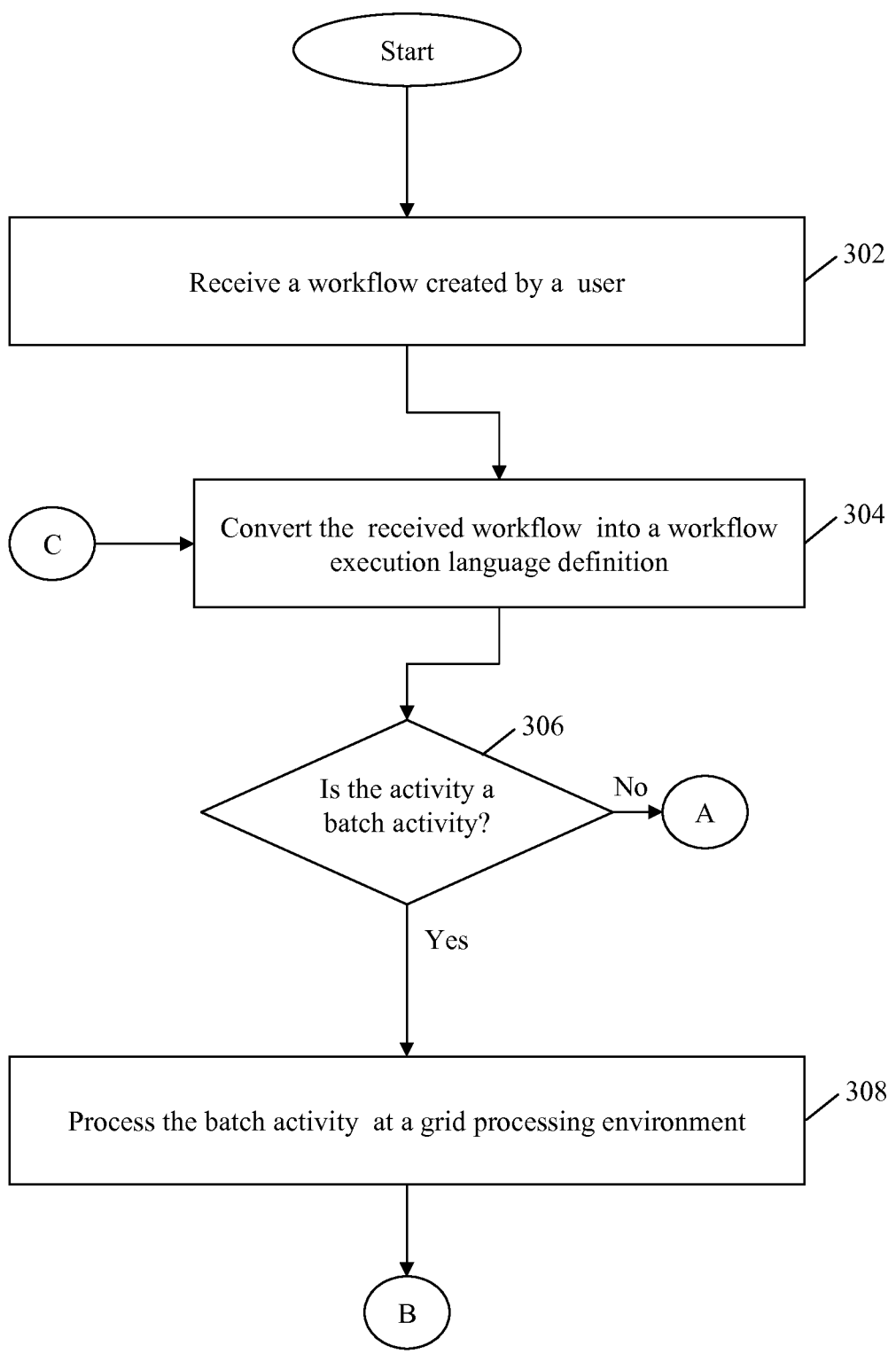
FIG. 3A and FIG. 3B illustrate a flowchart to process a workflow in a unified business process environment in accordance with an embodiment of the present invention.
Figure 3B:
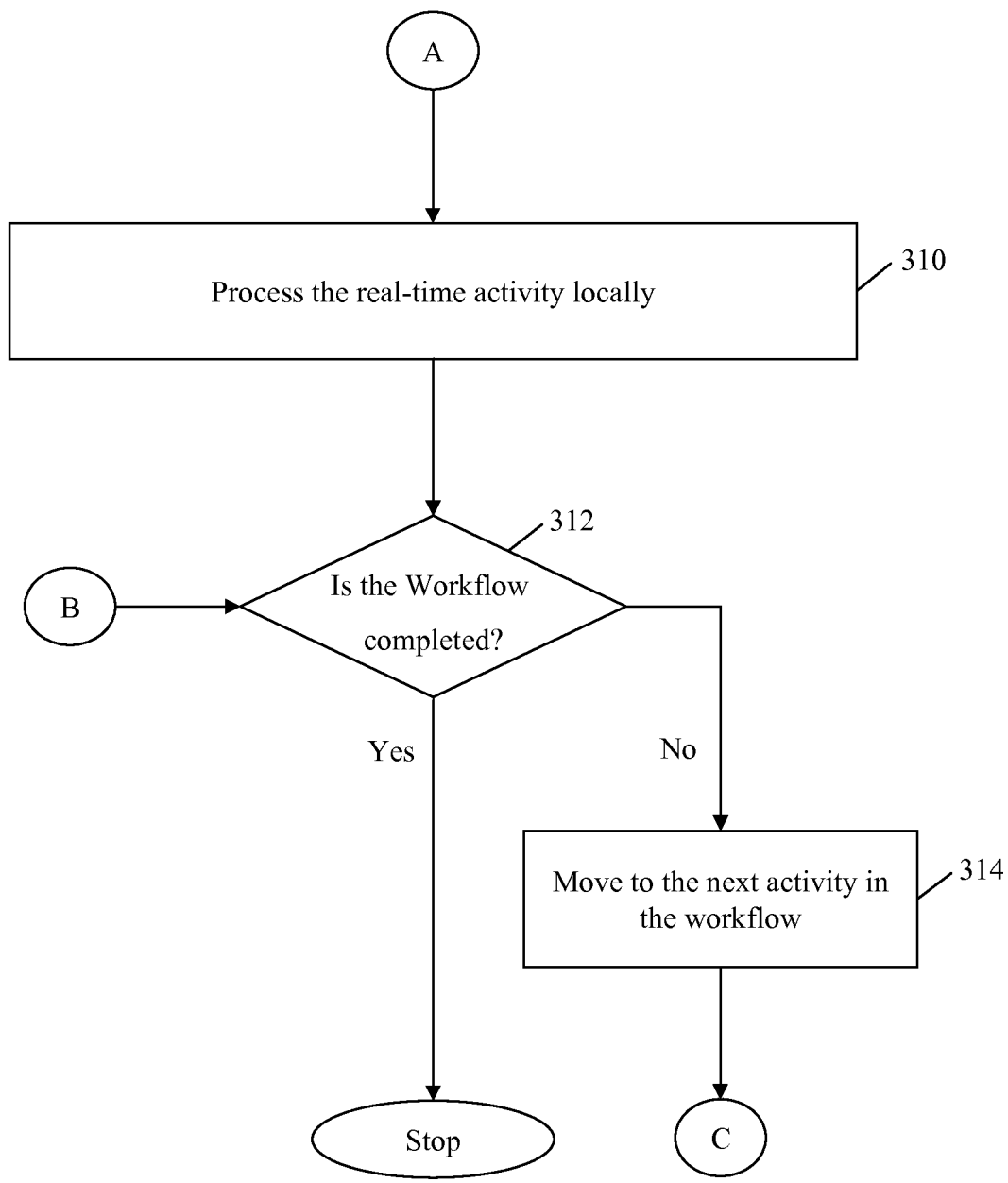

FIG. 3A and FIG. 3B illustrate a flowchart to process a workflow in a unified business process environment in accordance with an embodiment of the present invention. As described earlier, a business process may include at least one of a batch workflow and a real-time workflow. The invention provides the unified environment to model, execute and monitor workflows for various business processes. Further, it provides a developer with an end-to-end business process management solution enabled in a GRID processing environment.

At step 302, the unified business process environment receives a workflow created by a developer. The unified business process environment/integrated development environment (IDE) provides an interface to the developer to create a workflow for a business process. The developer defines the business process/workflow in the unified business process environment/IDE, which is captured pictorially. As described earlier the workflow received can be either a real-time workflow or a batch workflow based on the requirement of the business process. In an exemplary embodiment of the present invention, an interface enables a developer to create a workflow describing the steps to create monthly statement of a customer's bank account.

Thereafter, at step 304, the pictorial representation of the workflow is converted to a corresponding workflow execution language definition. In an exemplary embodiment of the present invention the workflow execution language definition used is Business Process Modeling Language (BPML) for a real-time workflow and GRID Workflow Description Language (GworkflowDL) for a batch workflow. It will be apparent to a person skilled in the art that various other workflow execution language definitions may be used for defining a real-time workflow and a batch workflow respectively. Each workflow constitutes one or more activities/processes to be processed. For example, in case a developer submits an instruction to complete an instantaneous fund transaction. The transaction is described by a real-time workflow, which includes one or more sub activities to be executed, such as verifying the end-user, checking the system status at the financial institution, processing the transaction and so forth.

At step 306, a check is performed to verify that whether the activity in the received workflow is a batch activity. In an embodiment of the present invention, an attribute "type" associated with the received activity is checked. In an exemplary embodiment of the present invention the attribute "type" denotes a batch activity as "batch" and a real-time activity as "real-time". If the received activity is ascertained to be a batch activity by checking the attribute "type" of the received activity, then at step 308, the batch activity is processed at a GRID processing environment. In an exemplary embodiment of the present invention, the process to create the customer's monthly statement is identified as a batch activity, based on the attribute 'type'. After which, at step 308, the received batch activity is processed at a GRID processing environment. The processing of the batch activity at the GRID processing environment is further explained in conjunction with FIG. 1, FIG. 2 and FIG. 4. If the received activity is ascertained to be a real-time activity by checking the attribute "type" of the received activity then at step 310, the real-time activity is processed locally.

At step 312, the workflow is checked for any remaining activity. In an embodiment of the present invention, each of the business process workflow includes one or more activities. Each of the activities are further enqueued for processing based on predefined conditions, such as priority to process the activity, conditional relation with other activities and so forth. After processing the received activity, the workflow is checked to execute any remaining activity. If the workflow is found to be complete, i.e. all the activities in the workflow are processed, then the processing of the workflow is deemed "complete" and the status of the corresponding workflow is updated.

If the workflow is ascertained as incomplete at step 312, i.e. there are activities remaining in the workflow enqueue for execution, then at step 314, the next activity is selected and is subsequently executed at step 304.

Figure 4A:
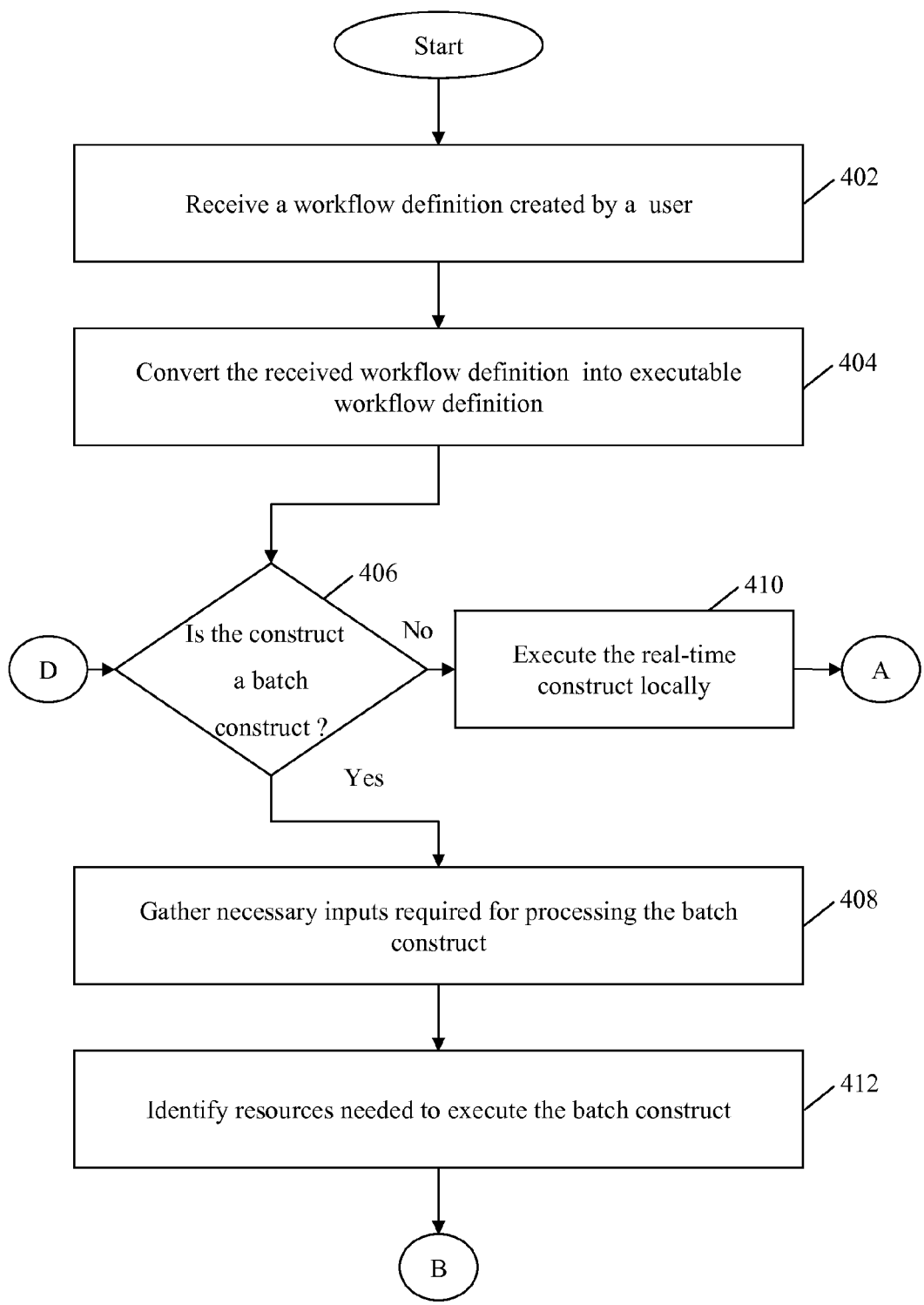
FIG. 4A, FIG. 4B and FIG. 4C illustrate a flowchart to process a workflow in a unified business process environment in accordance with another embodiment of the present invention.
Figure 4B:
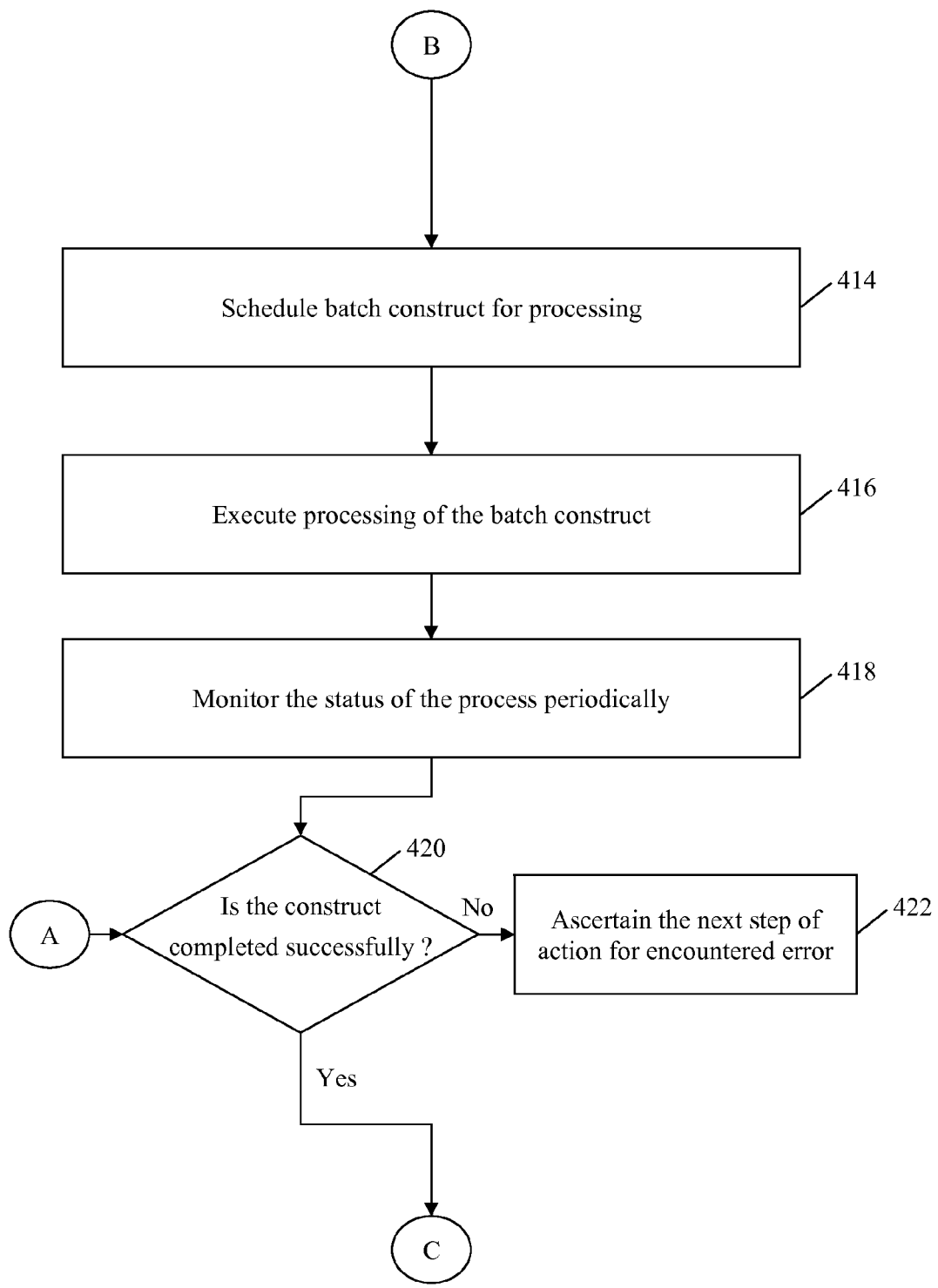
Figure 4C:
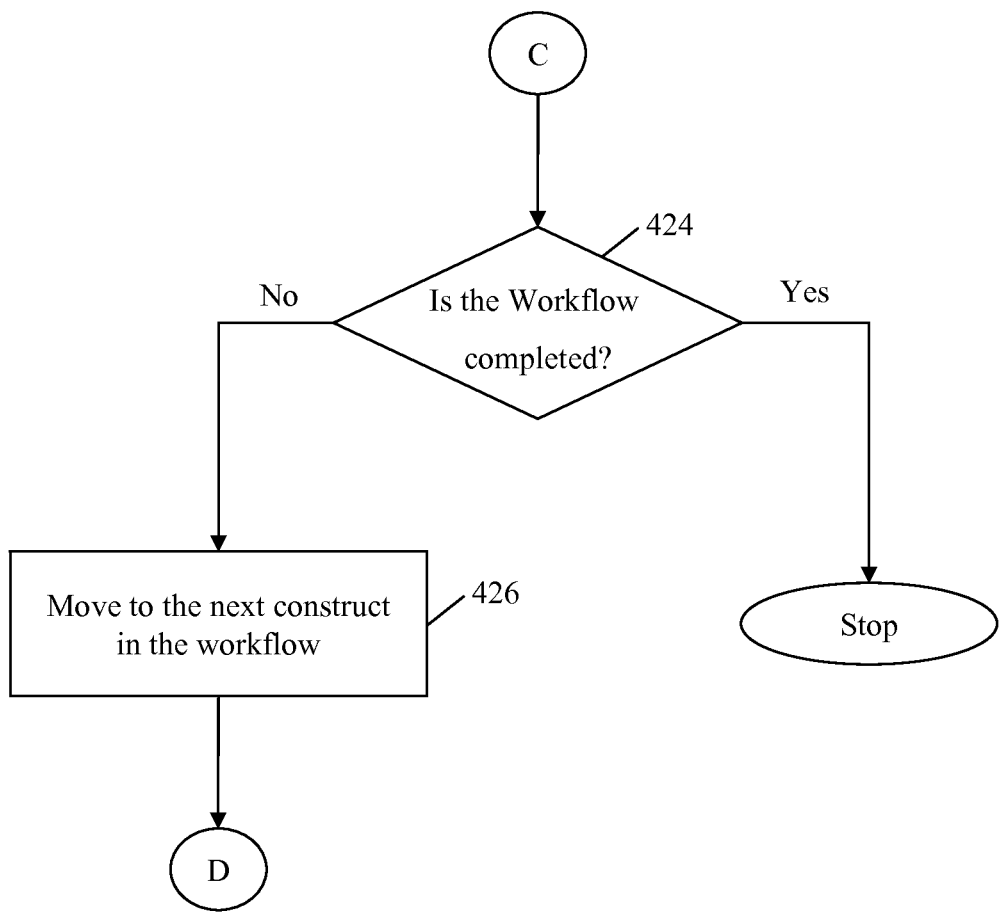

FIG. 4A, FIG. 4B and FIG. 4C illustrate a flowchart to process a workflow in a unified business process environment in accordance with another embodiment of the present invention. The invention enables a developer to model, execute and monitor end to end business process including both a real-time workflow and a batch workflow in the unified business process environment.

At step 402, a workflow definition created by the developer is received, wherein the workflow is a business process. The unified business process environment/IDE provides an interface to the developer to create a definition of the business process/workflow. Further, the workflow definition is captured as a pictorial representation/model of the business process. The developer defines various activities involved in the workflow definition and correspondingly associates each activity to an appropriate construct, such as a real-time construct, a batch construct and so forth. In an embodiment of the present invention, the developer may model the set of activities using various pictorial function blocks, such as fork, join, and so forth enabled in the interface. Each of the pictorial functional blocks denotes a unique functional relation between the associated activities. A construct is inherently associated by a "Type" attribute, which defines execution methodology of the corresponding construct. The "Type" is defined either as "real-time" or "batch" based on the execution behavior of the construct. The real-time activity is invoked by at least one of: a human intervention, a synchronous call and an asynchronous callback. A human intervention refers to a method by which a developer invokes the real-time activity with an external command. In case of a synchronous call, the real-time activity is invoked by the output of other activities (batch or real-time), i.e. it waits for the processing of an associated activity to be completed for further execution. And, in case of a asynchronous callback, the real-time activity is invoked as soon as it is initiated, i.e. it does not wait for the execution of any associated activity (batch or real-time). In an exemplary embodiment of the present invention, a developer defines a process to complete an instantaneous online fund transaction. The developer models a workflow definition to process the workflow construct. The workflow construct created is further identified as "real-time" based on the execution behavior of the workflow construct. Subsequently, the "Type" attribute associated with the workflow construct is updated as "real-time". The real-time workflow construct may include, an activity to validate customer, an activity to check financial institution information, an activity to process transaction, an activity to inform customer of the final status of the transaction and so forth. Alternately, a batch activity is autonomous and further its execution is invoked by a pre-defined condition, such as an initiation time, a system status, trigger by another activity and so forth.

At step 404, the received workflow definition/business process model is further converted into executable workflow definition. It will be apparent to a person skilled in the art that various workflow execution languages are available to define the business process/workflow model, such as Business Process Execution Language, and Workflow Process Definition Language. In an embodiment of the present invention, Business Process Modeling Language (BPML) is used for the real-time workflow construct and GRID Workflow Description Language (GWorkflowDL) is used for the batch workflow construct. The workflow model includes workflow constructs, which are defined as either a real-time workflow construct or a batch workflow construct by the developer. Subsequently, the workflow construct are converted into an executable workflow definition using its respective workflow execution language. For example, in case one of the workflow construct is defined as a real-time workflow construct, such as an online transaction, then it is converted into an executable workflow definition using Business Process Modeling Language (BPML). On the other hand, in case one of the workflow construct is defined as a batch workflow construct, such as a monthly statement generation, then it is converted into an executable workflow definition using GRID Workflow Description Language (GWorkflowDL). Furthermore, each of the dependencies, such as data and control flows, associated to the respective workflow constructs are identified and stored correspondingly.

At step 406, it is checked whether the received workflow is a batch construct. The "type" attribute associated with the workflow is checked to identify the workflow construct as either a real-time workflow construct or a batch workflow construct. If it is ascertained that the received workflow is a batch workflow construct, then at step 408, corresponding input/output parameters or files may be gathered for processing the batch construct. In an embodiment of the present invention, execution of a batch workflow may be triggered without input/output parameters. In another embodiment of the present invention, various generic batch workflows may fetch files from predetermined repositories for further processing and execution. The files may be stored either locally or at any remote location accessible by the system.

If it is ascertained that the received workflow is a real-time workflow construct, then at step 410 the corresponding necessary inputs required for processing the real-time construct are gathered and subsequently the real-time construct is executed locally.

In another embodiment of the present invention, a real-time construct may be executed at the grid. After identifying the construct as a real-time construct, at step 406, an attribute called "realtime" (of xsd:Boolean type) assigned to the real-time construct is checked. The "realtime" attribute defines the behavior of the real-time construct. In case the "realtime" attribute=true, then the real-time construct is processed locally. Alternately, if the "realtime" attribute=false, then the real-time construct is processed at a GRID processing environment. Further, in case the "realtime" attribute=false, then various execution details, such as scheduling time, frequency and so forth, are associated with the real-time construct. It may be apparent to a person skilled in the art that various other attributes may be defined in place of "realtime", to depict the execution behavior of the real-time construct.

At step 412, one or more resources required to execute the batch construct and the list of quality of service (QoS) parameters, such as operating system required, architecture required, memory requirements, software dependencies and so forth, are identified. Subsequently, at step 414, the batch construct is scheduled for processing based on the QoS parameters and the one or more resources identified. In an exemplary embodiment of the present invention, a batch construct which is complex and resource intensive requires a greater number of one or more resources in comparison to a batch construct which is simpler.

Thereafter, the processing of the batch construct (job) is executed in a GRID environment at step 416. After which, the status of the submitted batch construct is periodically monitored and the corresponding status of the process is updated at step 418. The process to execute the batch construct is further explained in conjunction with FIG. 1, FIG. 2, and FIG. 3.

At step 420, a check is performed to ascertain whether the processing of the received construct is completed successfully. On receiving the status update of the received construct as 'completed', it is checked whether the construct (either real-time or batch) has been processed successfully (without any errors). If it is ascertained that the construct has been processed successfully then at step 424, a check is performed to ascertain whether the workflow is completely processed, i.e. whether all the constructs in the workflow has been processed. If it is ascertained at 424, that all the constructs in the workflow for a business process have been completely processed, then the processing of the business process is deemed 'complete'. If it is ascertained at 424, that all the constructs in the workflow for a business process have not been processed then the next construct enqueue for processing is selected at 426 and subsequently executed at step 406.

If it is ascertained at 420, that the construct has not been processed successfully, then at 422, the next step of action for the encountered error is ascertained. On detecting unsuccessful completion of the received construct, the error occurred is checked and compared to a list of predefined error conditions. The list of predefined error conditions further includes necessary steps of corrective actions mapped respectively to each error conditions included in the list. It may be apparent to a person skilled in the art that the list of corrective actions mapped to its respective error conditions may be continuously updated based on the errors encountered during various business processes.

Figure 5A:
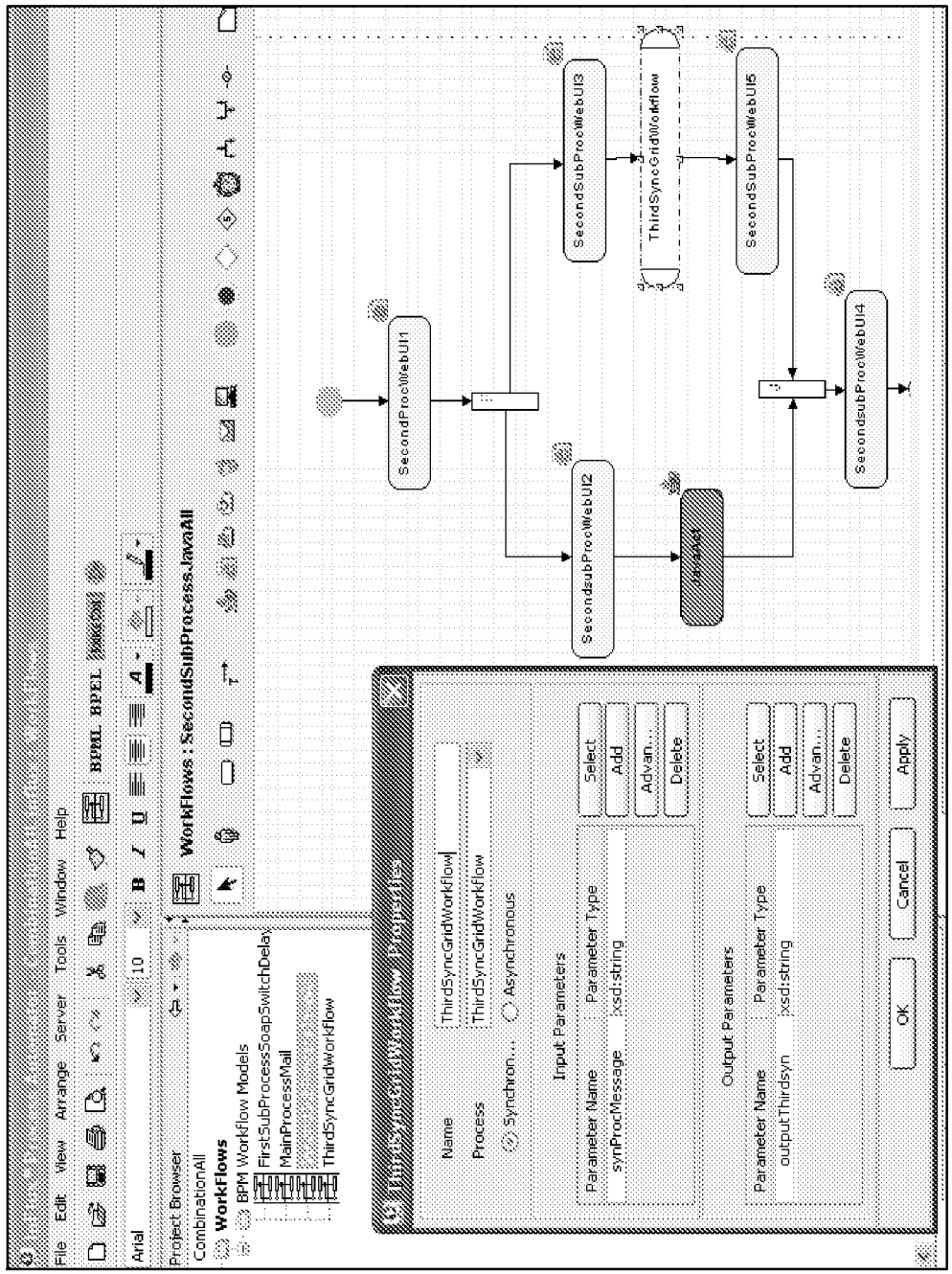
FIG. 5A and FIG. 5B are screenshots of a unified business process environment in an exemplary embodiment of the present invention.
Figure 5B:
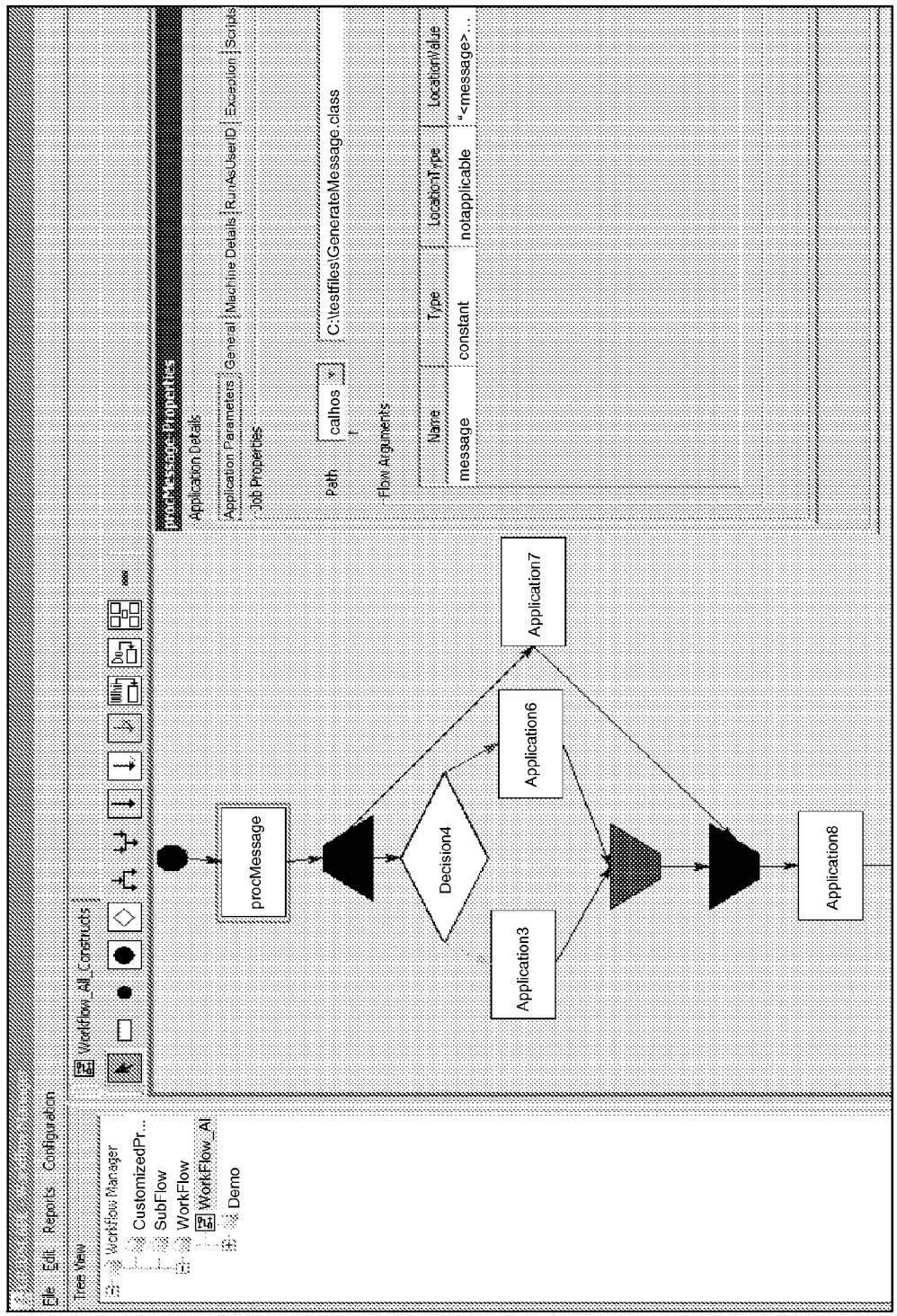

FIG. 5A and FIG. 5B are screenshots of a unified business process environment in an exemplary embodiment of the present invention.

FIG. 5A outlines an exemplary screenshot of a real-time workflow created in the unified business process environment. The real-time workflow further includes a batch construct. Furthermore, a pane titled "ThirdSyncGRIDWorkflow Property" is outlined, in which various parameters of the workflow is defined, such as whether the workflow is synchronous or asynchronous (based on the requirement of the business process), the input/output parameters and so forth. The output of the batch construct is also saved in a corresponding output file at the local machine. In an exemplary embodiment of the present invention, the real-time workflow can access the output of the batch construct by incorporating a java activity to read the output file.

FIG. 5B outlines an exemplary batch workflow created in the unified business process environment. The developer is enabled to create a batch workflow comprising a plurality of constructs, wherein each of the constructs defines a particular batch activity. Further, each of the constructs can be connected with at least one of a fork, join, box, loop and so forth, which describes the relational transition with the subsequent construct. Furthermore, the FIG. 5B outlines a batch workflow titled "procMessage", the input of the batch workflow is defined by an input file titled "message" and the corresponding output of the batch workflow is saved at an output file titled "outputThirdsyn" (not shown). Moreover, the output file may be defined as either to be visible or hidden to other processes implemented in the unified business environment.

Various embodiments of the present invention, may be implemented via one or more computer systems. The computer system is not intended to suggest any limitation as to scope of use or functionality of described embodiments. The computer system includes at least one processing unit and memory. The processing unit executes computer-executable instructions and may be a real or a virtual processor. In an embodiment of the present invention, the memory may store software for implementing various embodiments of the present invention. Typical examples of a computer system include a general-purpose computer, a programmed microprocessor, a micro-controller, a peripheral integrated circuit element, and other devices or arrangements of devices that are capable of implementing the steps that constitute the method of the present invention.

The present invention may suitably be embodied as a computer program product for use with a computer system. The method described herein is typically implemented as a computer program product, comprising a set of program instructions for controlling a computer or similar device. The set of program instructions may be a series of computer readable instructions fixed on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared or other transmission techniques These instructions can be supplied preloaded into a system or recorded on a storage medium such as a CD-ROM, or made available for downloading over a network such as the Internet or a mobile telephone network. The series of computer readable instructions may embody all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for executing and managing a business process in a unified business process environment, the method comprising the steps of:

receiving, via program instructions by a computing system, a business process from a user in a unified business process environment, wherein the business process comprises at least one workflow;

ascertaining, via program instructions by a computing system, execution details of the received at least one workflow based on a predefined attribute of the at least one workflow; and processing, via program instructions by a computing system, the at least one workflow at a location selected from at least one of a grid processing environment and a local processing environment, based on the ascertained execution details of the at least one workflow;

wherein, the step of processing the at least one workflow at the location further comprises:
  executing, via program instructions by a computing system, the at least one workflow at the grid processing environment, in case the predefined attribute of the at least one workflow is a batch workflow; and
  executing, via program instructions by a computing system, the at least one workflow at the local processing environment, in case the predefined attribute of the at least one workflow is a real-time workflow; wherein said computing systems comprising a computer processor.

2. The method of claim 1, further comprising the steps of:
  converting, via program instructions by a computing system, the received at least one workflow in a batch workflow execution language definition, in case the received at least one workflow is a batch workflow; and
  converting, via program instructions by a computing system, the received at least one workflow in a real-time workflow execution language definition, in case the received at least one workflow is a real-time workflow.

3. The method of claim 1, wherein the step of executing the at least one workflow at a grid processing environment further comprises:
  identifying, via program instructions by a computing system, one or more resources at the grid processing environment to process the at least one workflow, based on one or more predetermined parameters of the at least one workflow;
  scheduling, via program instructions by a computing system, the at least one workflow at the one or more identified resources based on the one or more predetermined parameters of the at least one workflow; and
  executing, via program instructions by a computing system, the scheduled at least one workflow at the one or more identified resources.

4. The method of claim 3, further comprises the step of monitoring, via program instructions by a computing system, status of the processing of the at least one workflow at the grid processing environment after initiating execution of the at least one workflow.

5. The method of claim 3, wherein the one or more predetermined parameters include at least one of a processing requirement, complexity, operating system, required architecture and execution time of the at least one workflow.

6. The method of claim 1, wherein the step of processing the at least one workflow at the local processing environment further comprises monitoring, via program instructions by a computing system, status of the processing of the at least one workflow at the local processing environment after initiating execution of the at least one workflow.

7. A system for executing and monitoring a business process in a unified business process environment, the system comprising; a computer processor
  a Business Workflow Module in communication with a computing system and operative to receive a business process from a user, wherein the business process comprises at least one workflow;
  a Workflow Orchestrator in communication with the computing system and operative to process the at least one workflow at a location selected from at least one of a grid processing environment and a local processing environment, based on a predefined attribute of the at least one workflow; and
  a Workflow Monitoring and Control Module in communication with the computing system and operative to monitor the status of the processing of the at least one workflow at the predetermined processing location;
  wherein, the Workflow Orchestrator comprises: a Core Orchestration Engine operative to process the at least one workflow at a predefined location based on the predefined attribute of the at least one workflow;
  wherein, the Core Orchestration Engine comprises:
    a Batch Construct Handler operative to process the at least one workflow at a grid processing environment in case the predefined attribute of the at least one workflow is batch; and
    a Real-time Construct Handler operative to process the at least one workflow at a local processing environment in case the predefined attribute of the at least one workflow is real-time.

8. The system of claim 7, wherein the Business Workflow Module is further operative to convert the received at least one workflow in a workflow execution language definition.

9. The system of claim 7, wherein the Workflow Orchestrator further comprises:
  a Workflow Reporting Module operative to monitor the status of the processing of the at least one workflow at the predefined processing location.

10. The system of claim 7, wherein the Workflow Orchestrator further comprising a error handling module operative to direct one or more corrective actions in case it detects occurrence of one or more errors while processing the at least one workflow.

11. The system of claim 7, wherein the Core Orchestration Engine further comprising a GRID Workflow Orchestration Module operative to orchestrate the at least one workflow at a GRID processing environment, after being processed by the Batch Construct Handler.

12. The system of claim 7, further comprising:
  a Meta-Scheduler and Job Management Module in communication with the computing system and operative to identify one or more resources and subsequently schedule the at least one workflow based on at least one of: one or more predetermined parameters of the at least one workflow and the identified one or more resources; and
  a GRID Middleware in communication with the computing system and operative to execute the scheduled at least one workflow at the identified one or more resources.

13. The system of claim 12, wherein the Meta-Scheduler and Job Management Module comprising:
  a Meta Scheduling Module operative to schedule the at least one workflow based on the one or more predetermined parameters;
  a GRID Job Management Module operative to route the scheduled at least one workflow to the grid middleware to further execute it; and
  a GRID Job Reporting Module operative to track the status of the executed at least one workflow at a Grid Infrastructure.

14. The system of claim 13, wherein the GRID Infrastructure includes the one or more resources identified for processing the at least one workflow.

15. A computer program product comprising a computer-readable medium having a computer-readable program code stored thereon, the computer-readable program code comprising instructions that, when executed by a computing system, cause the computing system to:
  receive a business process from a user in a unified business process environment, wherein the business process comprises at least one workflow;

ascertain execution details of the received at least one workflow based on a predefined attribute of the at least one workflow; and process the at least one workflow at a location selected from at least one of a grid processing environment and a local processing environment, based on the ascertained execution details of the at least one workflow;

wherein the computer-readable program code further comprises instructions that, when executed by a computing system, causes the computing system to:

execute the at least one workflow at the grid processing environment, in case the predefined attribute of the at least one workflow is a batch workflow; and execute the at least one workflow at the local processing environment, in case the predefined attribute of the at least one workflow is a real-time workflow.

16. The computer program product of claim 15, wherein the computer-readable program code further comprises instructions that, when executed by a computing system, causes the computing system to:

convert the received at least one workflow in a batch workflow execution language definition, in case the received at least one workflow is a batch workflow; and convert the received at least one workflow in a real-time workflow execution language definition, in case the received at least one workflow is a real-time workflow.

17. The computer program product of claim 15, wherein the computer-readable program code further comprises instructions that, when executed by a computing system, causes the computing system to:

identify one or more resources at the grid processing environment to process the at least one workflow, based on one or more predetermined parameters of the at least one workflow;

schedule the at least one workflow at the one or more identified resources based on the one or more predetermined parameters of the at least one workflow; and execute the scheduled at least one workflow at the one or more identified resources.

18. The computer program product of claim 17, wherein the computer-readable program code further comprises instructions that, when executed by a computing system, causes the computing system to monitor status of the processing of the at least one workflow at the grid processing environment after initiating execution of the at least one workflow.

19. The computer program product of claim 15, wherein the computer-readable program code further comprises instructions that, when executed by a computing system, causes the computing system to monitor status of the processing of the at least one workflow at the local processing environment after initiating execution of the at least one workflow.

* * * * *